Feb. 14, 1939.  A. E. W. JOHNSON ET AL  2,146,898
POTATO DIGGER
Filed Dec. 6, 1937   3 Sheets-Sheet 3
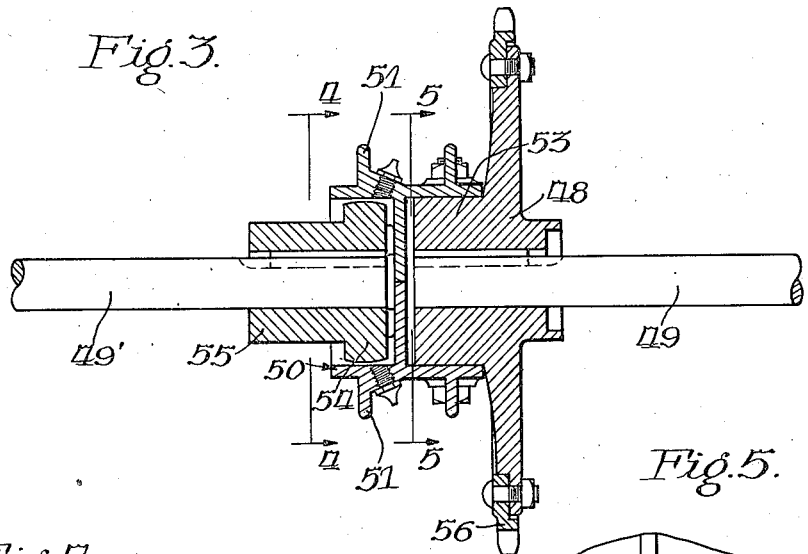
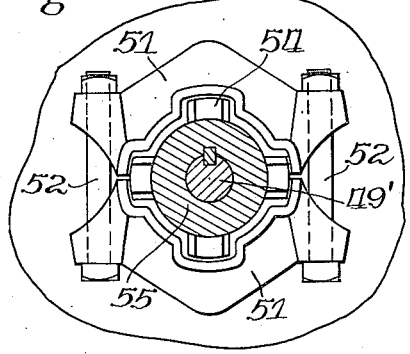
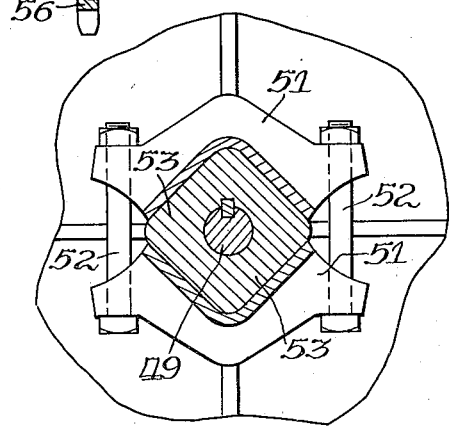
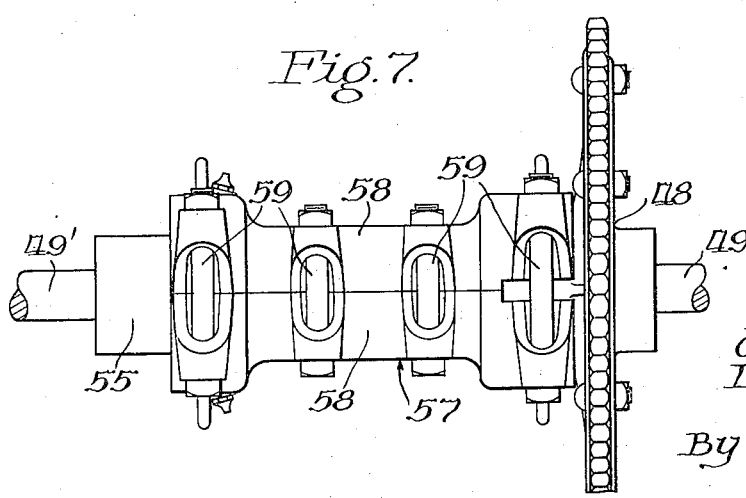
Inventor
A. E. W. Johnson
Lee H. Kaupke
By V. F. Lasagne
Att'y.

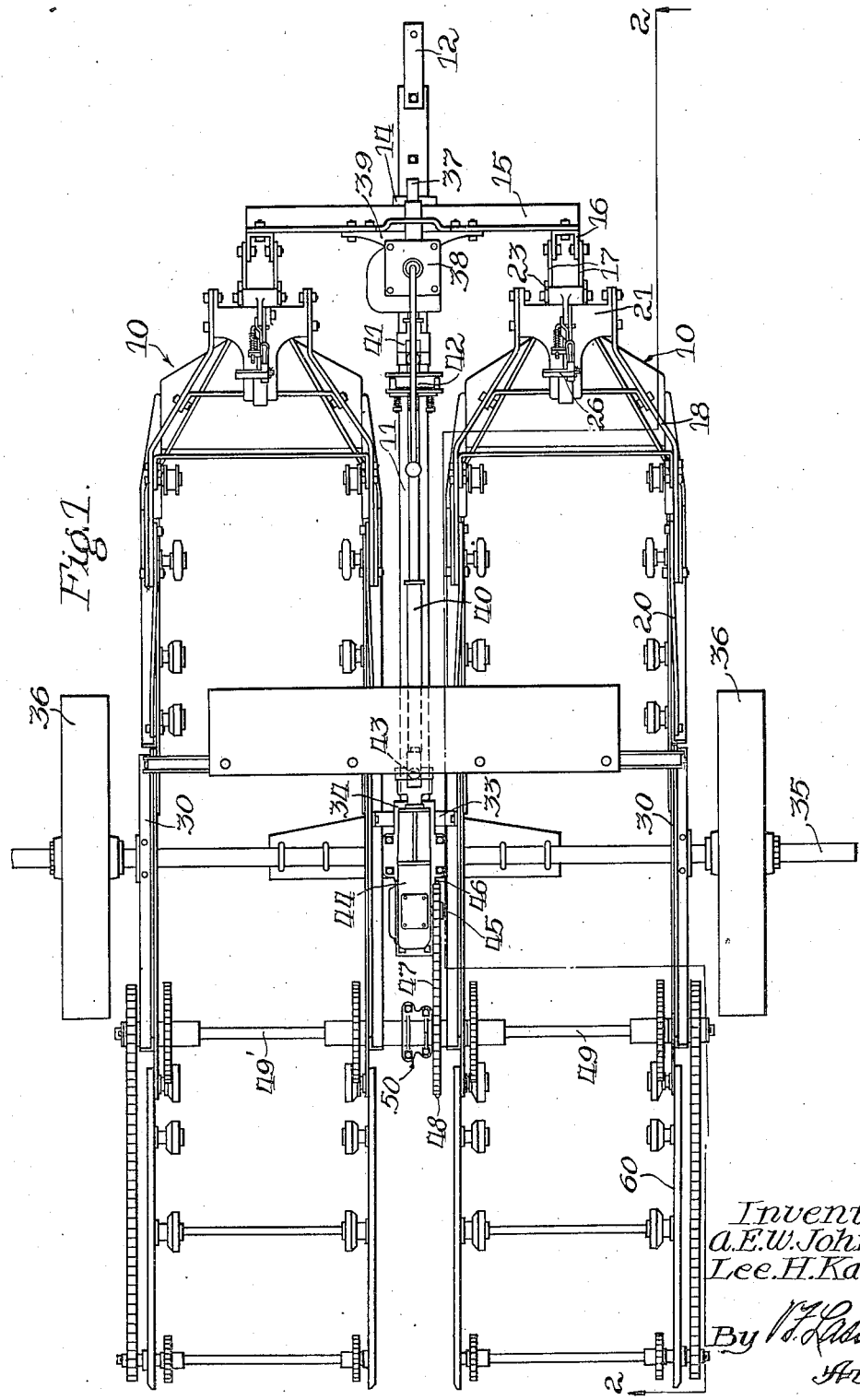

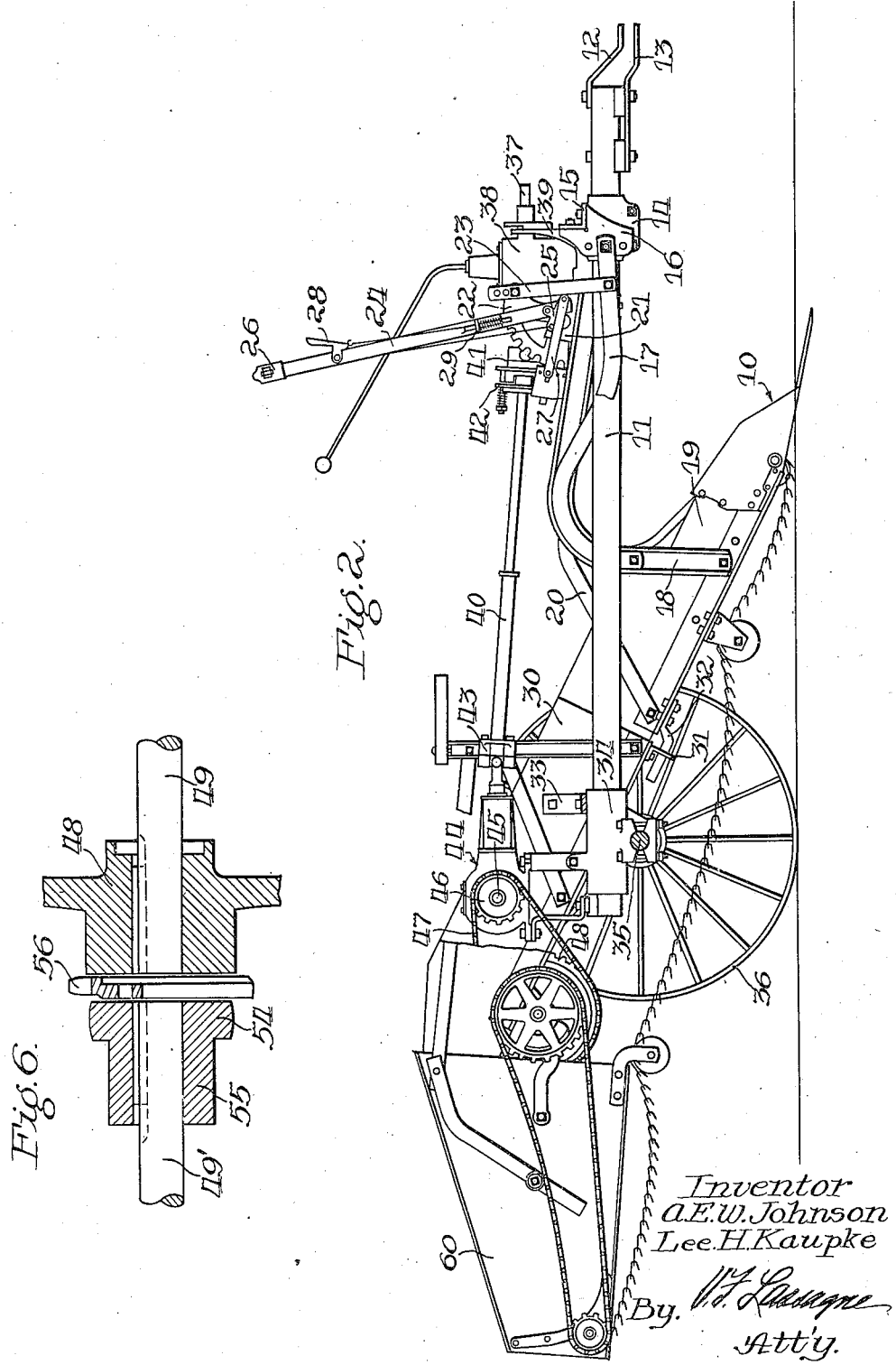

Patented Feb. 14, 1939

2,146,898

UNITED STATES PATENT OFFICE 2,146,898

POTATO DIGGER

Arnold E. W. Johnson, Chicago, Ill., and Lee H. Kaupke, Auburn, N. Y., assignors to International Harvester Company, a corporation of New Jersey Application December 6, 1937, Serial No. 178,228

8 Claims. (Cl. 55—51)

This invention relates to a potato digger.

The principal object of the invention is to provide a two-row potato digger, from which the usual superstructure has been eliminated.

Another object is to provide an improved driving mechanism for a two-row potato digger.

Other objects will appear to those skilled in the art as the disclosure is more fully made.

In two-row potato diggers, the problem of operating independent, movable digger units from a common drive shaft is encountered. It has been the practice to provide one or more jackshafts above the digger units and to drive these shafts from the drive shaft and the main shafts of the units from the jack-shafts. Such an arrangement permits the units to have some motion with respect to one another, but provides a structure extending above the units.

According to the present invention, this superstructure is eliminated. More particularly, the main drive shaft is connected to the main shaft of one of the units, and a universal connection extends from the latter shaft to the main shaft of the other unit. Thus, the units are permitted some relative movement. The universal connection between the shafts is obtained through a removable member formed in halves. A space is provided between the ends of the shafts to allow the insertion of a sprocket chain connecting the main drive shaft and the main shaft of the one unit.

In the drawings:

Figure 1 is a plan view of the improved potato digger;

Figure 2 is a sectional elevational view taken along the line 2—2 of Figure 1;

Figure 3 is a detail view of the universal connection between the shafts of the digger units;

Figure 4 is a sectional view taken along the line 4—4 of Figure 3;

Figure 5 is a sectional view taken along the line 5—5 of Figure 3;

Figure 6 shows the shafts of the digger units with the universal connection removed, and with a sprocket member passed between the ends of the shafts; and, Figure 7 is a detail, showing a modified form of universal connection between the shafts of the digger units.

As seen in Figure 1, the improved potato digger consists of a pair of digger units 10 to be attached to a tractor or other means for supplying power. A central tubular member 11 extends between the digger units and is attached to the draw-bar of a tractor, not shown, through straps 12 and 13. Mounted on the tubular member 11, immediately behind the straps 12 and 13, is a casting 14, which supports a transversely extending member 15. The front of each digger unit is attached to an end of this transverse member through a bracket 16 and braces 17. The rear ends of the braces 17 are connected to members 18, which, in turn, are fastened at one end to the movable nose portion 19 of the digger units. A member 20 is also fastened to this portion of the digger unit as well as to the members 18, and together the two members constitute a rigid connection to the nose portion. The forward ends of the members 18 support a bracket 21, which carries means for effecting a raising or lowering of the nose portion 20 of the digger units. This means comprises an arcuate toothed member 22 pivoted in the bracket 21. Links 23 extend from one end of the arcuate member down to the braces 17. A lever 24 is pivoted to the bracket 21 on the same axis as the arcuate member 22. A member 25 is pivoted on the side of the lever and is connected at one side through a wire to a control member 26 on the lever 24, and on the other side through a link 27 operating a detent in the arcuate member 22. A second control 28 on the lever 24 is connected through a wire to a latch 29 in the arcuate member 22. This means for lifting the nose portion of the digger unit is disclosed in the patent to Smith No. 1,988,254 dated January 15, 1935, and forms no part of the present invention.

The rear portion 30 of the digger unit is connected to the nose portion through a slotted angle member 31 and pins 32. The rear portion of each digger unit is supported by the central tubular member 11 through a U-shaped member 33 and a casting 34 sleeved over the tubular member. The lower side of the casting 34 has a bearing portion which rests on a transverse axle 35 supported on wheels 36.

Connection with a power take-off shaft (not shown) on the tractor is established through a stub shaft 37 extending from a transmission 38 carried by a bracket 39 attached to the transverse member 15 directly over the central tubular member 11. Extending rearwardly between the units is a telescopic driving shaft 40 connected to the transmission through a universal joint 41 and clutch 42. The telescopic shaft is connected at its rearward end, through a universal joint 43, to a gear box 44. A transverse stub shaft 45, mounted in the gear box, carries a sprocket 46. A sprocket chain 47 connects the sprocket 46 and a sprocket 48 keyed to a drive shaft 49 of one of the digger units.

As seen in Figure 3, a driving connection between the drive shaft 49 carrying the sprocket 48 and the drive shaft of the other digger unit is established through a universal joint member 50. This joint member is formed of cast or forged halves 51 held together by bolts 52 against a portion 53 of substantially square section on the sprocket 48. It is also clamped over a toothlike projection 54 on a sleeve member 55 keyed on the drive shaft 49'. It will be noted that the outer surfaces of the portions 54 are curved. This permits the shaft 49', upon which the member 55 is mounted, to rock slightly with respect to the universal joint member 50; thus, a universal connection between the shafts is effected.

It will be noted from Figures 3 and 6 that the ends of the shaft 49 are spaced a sufficient distance to permit the removal of a detachable rim 56 of the sprocket 48. Thus, a rim of different size may be substituted and the units driven at a different speed for the same speed of driving shaft 40. The space between the ends of the shafts 49 and 49' is also sufficient to allow the removal of the sprocket chain 47.

Figure 7 shows a modification of the above described universal joint member. A modified joint member 57 consists of elongated halves 58 joined by four sets of bolts 59. This joint member may be used where a greater spacing between the ends of the drive shafts is required. In such a case, the space may be great enough to allow the removal of the entire sprocket 48.

At the rear of the potato digger are extension elevators 60 of the type disclosed in the patent to Gronke et al. No. 1,673,193 dated June 12, 1928. These form no part of the present invention.

From the above description it will be evident that applicants have provided a two-row potato digger structure in which the digger units may move relatively to one another without the use of superstructure. It is intended to limit the invention only by the terms of the appended claims.

What is claimed is:

1. A potato digger comprising a frame structure, a pair of digger units mounted on said frame structure, drive shafts within the digger units, a universal connection between the drive shafts, a driving shaft extending between the digger units and operatively connected to one of the drive shafts.

2. A potato digger comprising a frame structure, digger units mounted in generally parallel arrangement on said frame structure and having drive shafts substantially in line with one another, a driving shaft extending between said digger units at a substantial angle to the drive shafts of the units and operatively connected to one of the drive shafts, and a universal connection between the drive shafts.

3. A potato digger comprising a frame structure, digger units mounted thereon, a driving shaft also mounted on the frame structure and extending between the digger units, drive shafts for the units substantially in line and at right angles to the driving shaft and having a universal connection therebetween, and means connecting the driving shaft and one of the drive shafts.

4. A potato digger comprising a frame structure, a pair of digger units mounted thereon, a pair of drive shafts for said units substantially in line, means forming a universal driving connection between said drive shafts, a driving shaft extending substantially at right angles to said drive shafts, and means for operatively connecting the driving shaft and one of the drive shafts.

5. A potato digger comprising a frame structure, a pair of digger units mounted on the frame structure, a driving shaft extending between the digger units, drive shafts within the units substantially in line with one another and at right angles to the driving shaft, means forming a driving connection between the driving shaft and one of the drive shafts, and means forming a universal driving connection between the drive shafts, said means being formed of removable halves.

6. A potato digger comprising a frame structure, a pair of digger units mounted thereon, a driving shaft extending between the digger units, a drive shaft within one of the units extending at substantially right angles to the drive shaft, means forming a driving connection between the driving shaft and drive shaft including a sprocket with a demountable rim mounted on the drive shaft, a drive shaft within the other digger unit and substantially in line with and spaced from the drive shaft in the first digger a distance at least as great as the thickness of the demountable gear rim on the sprocket, and means forming a removable universal driving connection extending between the ends of the shaft, whereby upon removal of the last mentioned means the demountable gear rim may be removed through the space between the ends of the drive shaft.

7. A potato digger comprising a frame structure, a pair of digger units mounted thereon, a pair of drive shafts within the units substantially in line and with a substantial space between their ends, a hub member sleeved over the end of one of the shafts, a removable sprocket rim carried by the hub member, a joint member having rounded surfaces sleeved over the end of the other shaft, a removable sleeve member formed in halves clamping the hub and the joint member, a driving shaft extending substantially at right angles to the drive shafts and driving the drive shaft carrying the hub member through the sprocket rim, the space between the ends of the shafts being at least as great as the width of the sprocket rim, whereby upon removal of the sleeve the sprocket rim may pass through the space between the ends of the shafts.

8. A potato digger comprising a frame structure, digger units mounted on the frame structure and having drive shafts, a driving shaft extending between the digger units, a gear box between the units connected to the driving shaft, a stub shaft mounted in the gear box, a sprocket mounted on said stub shaft, a sprocket mounted on the drive shaft of one of the digger units, a chain operatively connecting the two sprockets, and a universal connection between the drive shaft of the first digger unit and the drive shaft of the second digger unit.

ARNOLD E. W. JOHNSON.
LEE H. KAUPKE.